United States Patent

Hargraves et al.

[11] 4,202,373
[45] May 13, 1980

[54] FOUR WAY VALVE

[75] Inventors: David P. Hargraves, Webster Groves; Jude A. Pauli, Florissant; Steven E. Williams, St. Louis, all of Mo.

[73] Assignee: Emerson Electric Co., St. Louis, Mo.

[21] Appl. No.: 840,299

[22] Filed: Oct. 7, 1977

[51] Int. Cl.² ............... F16K 11/06; F16K 31/06
[52] U.S. Cl. ................. 137/625.29; 137/625.43; 137/625.65
[58] Field of Search ............... 137/625.29, 625.43, 137/625.63; 62/324; 251/31

[56] References Cited

U.S. PATENT DOCUMENTS

| | | | |
|---|---|---|---|
| 3,212,527 | 10/1965 | Hall et al. | 251/31 X |
| 3,303,665 | 2/1967 | Ray | 62/324 |
| 3,369,790 | 2/1968 | McHale et al. | 137/625.65 X |
| 3,469,526 | 9/1969 | Gallagher | 137/625.65 X |
| 4,027,700 | 6/1977 | Perkins | 137/625.43 X |

*Primary Examiner*—Arnold Rosenthal
*Attorney, Agent, or Firm*—Polster, Polster and Lucchesi

[57] ABSTRACT

A four way valve assembly is provided which includes a main valve member operable by independent pilot valve actuation. The independent pilot operation means that the main valve stroke can be varied over a relatively wide range, enabling the valve to be produced in a number of sizes without requiring redesign of the pilot valve portion of the valve. A pilot body is mounted to the main valve and has a movable plunger of a conventional solenoid actuator attached to it. The plunger extends within the pilot body and has a loose fitting pilot slide mounted to its free end. The relative loose fitting pilot slide reduces the need for close manufacturing tolerances for the component parts used in constructing the pilot valve portion of the valve. The pilot slide is maintained in sealed relationship with a wall of the pilot body by relatively high pressure fluid passing through the pilot valve body. Solenoid operation enables the pilot slide to direct the high pressure to respective ends of the main valve, moving the valve between at least first and second positions.

10 Claims, 5 Drawing Figures

FOUR WAY VALVE

BACKGROUND OF THE INVENTION

This invention relates to four way valves, and in particular, to a four way valve utilized in reverse cycle refrigeration systems. While the invention is described in particular detail with respect to such refrigeration systems, those skilled in the art will recognize the wider applicability of the inventive concepts disclosed hereinafter.

In refrigeration systems, it is common to connect a first condenser-evaporator coil, a second condenser-evaporator coil, and an appropriate expansion device to a single refrigerant compressor through a reversible valve. The first coil ordinarily is an outdoor coil for condensing the compressor refrigerant, and the second coil is an inside coil for refrigerating the space of an enclosure such as a room or other space. In heat pump applications, the function of the first and second coils can be reversed, making the indoor coil the condenser to heat the space and the outdoor coil the evaporator coil to absorb heat from the outside. Four way valves permit easy change over between the functions of the first and second coils.

A number of four way or piston slide valves are known in the art. One particular valve useful in heat pump applications is disclosed in the U.S. Pat. to Hargraves, No. 3,985,154, owned by the assignee of the present invention. The U.S. Pat. No. 3,985,154 shows a particular embodiment for a four way valve with solenoid actuation arranged so that the distance of main valve movement may be increased or decreased appreciably, without affecting operation of the means utilized to actuate the pilot valve assembly. While the valve disclosed in the U.S. Pat. No. 3,985,154 works well for its intended purposes, the internal passageways in the main valve slide body utilized in that patent require relatively close tolerance machine operations. The machine operations affect valve cost adversely. The valve disclosed hereinafter retains the beneficial benefits of the U.S. Pat. No. 3,985,154 in that it incorporates a constant pilot stroke length, regardless of the stroke of the main valve member, but eliminates the machine operations required by the valve design disclosed in that patent.

One of the objects of this invention is to provide a four way valve having simplified construction.

Another object of this invention is to provide a low cost four way valve.

Still another object of this invention is to provide a four way valve having a main slide valve assembly, the stroke distance of which is independent of the stroke length of the solenoid device used to actuate the valve.

Yet another object of this invention is to provide a variety of four way valve designs having differing stroke lengths for the main slide valve assembly, but which employ a common solenoid actuating means.

Another object of this invention is to provide a pilot operated four way control valve in which the pilot slide is loosely mounted to a solenoid actuated device.

Still another object of this invention is to provide a pilot actuated device for a four way valve in which high pressure fluid passing through the valve is used to maintain the position of the pilot slide actuating member of the valve.

Other objects of this invention will be apparent to those skilled in the art in light of the following description and accompanying drawings.

SUMMARY OF THE INVENTION

In accordance with this invention, generally stated, a four way valve assembly includes a housing having a main valve member slidably mounted in it. The main slide member defines chambers on opposed ends of the housing body. An independent pilot body has four connection fittings formed in it. A pilot slide is movably mounted within the pilot body. The pilot slide is activated by a solenoid operated plunger. The pilot slide is loosely mounted with respect to the plunger so that alignment considerations between the solenoid and pilot body are largely eliminated. One connection fitting in the pilot body is attached to a source of low pressure, while two connection fittings on opposite sides of the first connection fitting are attached to the opposed chambers of the housing. A fourth connection fitting is attached to a source of high pressure. The slide is adapted to connect one of the two connection fittings attached to the opposed chambers to the low pressure connection fitting while exposing the other of the two connection fittings attached to the opposed chambers to high pressure fluid from the fourth connection fitting. The high pressure fluid within the pilot body also seats the pilot slide in its particular position.

DESCRIPTION OF THE PREFERRED EMBODIMENT

Figure 1:
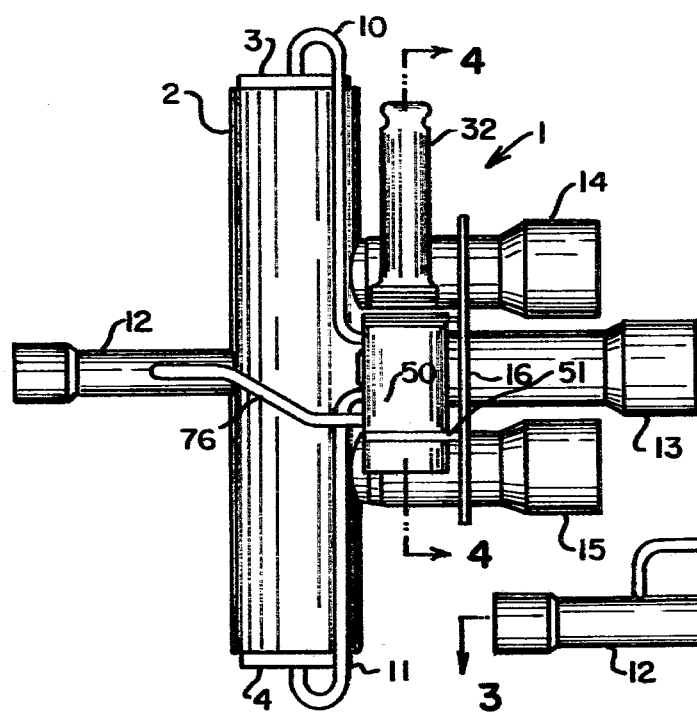
FIG. 1 is a top plan view of one illustrative embodiment of four way valve of this invention.

Referring now to FIG. 1, reference numeral 1 indicates one illustrative embodiment of valve of this invention. The valve 1 has a generally cylindrical housing 2 having a first end 3 and a second end 4. The housing 2 has a longitudinal opening 5 through it, between the ends 3 and 4, best seen in FIG. 3.

The ends 3 and 4 are closed by suitable end caps 6 and 7, respectively. The end caps 6 and 7 are attached to the housing 2 by any convenient method. Preferably, the housing 2 and end caps are constructed from a suitable metal material, and welding or brazing works well for that interconnection, for example. The housing 2 and the end caps define a cavity 8. The end cap 6 has a central opening 9 in it, while the end cap 7 has a similar opening 9' in it. The openings 9, 9' are sized to receive a fluid connector 10 and a fluid connector 11, respectively. The connectors 10 and 11 communicate with the cavity 8 through the openings 9, 9' and are used for purposes described hereinafter.

The housing 2 has a high pressure inlet pipe 12 attached to it, midway between the ends 3 and 4. A low pressure outlet pipe 13 extends outwardly from the housing 2 on a side of the housing 2 diametrically opposite the inlet 12. The inlet and outlet each communicate with the cavity 8. A pair of working lines 14 and 15 also are attached to the housing 2 and are aligned with the outlet pipe 13, respective ones of the working lines 14 and 15 lying on outboard sides of the outlet 13. It is conventional to provide a support 16 as an aid in maintaining a relatively rigid structural arrangement between the outlet 13 and the working lines 14 and 15. The housing 2 may be constructed from stock tubing, and the various pipes and working lines 12, 13, 14 and 15, respectively, may be inserted into appropriately drilled openings in the wall of the housing 2, and soldered into position. The lengths of the various pipes and working lines will depend upon the particular application of the valve 1.

Figure 3:
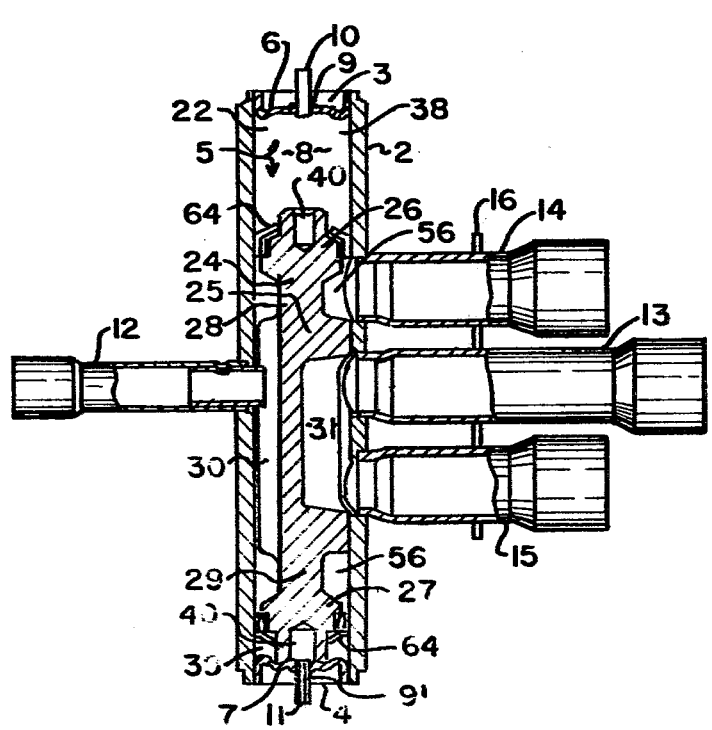
FIG. 3 is a sectional view taken along the line 3—3 of FIG. 2.

A main valve member 24, shown in FIG. 3, is movably mounted in the cavity 8 of the housing 2. The valve member 24 includes a body part 25 having a first end 26 and a second end 27. The ends 26 and 27 are joined to the body part 25 along reduced diameter connection portions 28 and 29, respectively. The valve member 24 generally has a cylindrical shape in silhouette, but has a hollow 30 formed on a first side of the body 25, and a pocket 31 formed on a side of the body 25 diametrically opposite the hollow 30. The hollow 30 is an oblong cavity extending generally along the axial length of the body 25. The actual longitudinal length of the hollow 31 is determined in part by the stroke length of the main valve member 24 and is designed so that the hollow 30 always is connected to a source of high pressure at the inlet 12. The pocket 31 likewise has a longitudinal length, determined in part by the stroke length of the main valve member 24, and the spacing between respective ones of the pipes 14 and 15 and the outlet 13. That is to say, the pocket 31 connects one of the working lines 14 and 15 with the outlet 13 in one position of the valve member 24, and the other of the working lines 14 and 15 with the outlet 13 in a second position of the valve member 24.

The ends 26 and 27 of the valve member 24 define, with the housing 2, respective first and second opposed chambers 38 and 39. Each of the ends 26 and 27 of the main valve member is fitted with a suitable sealing device, indicated generally by the numeral 64, which permits movement of the main valve 24 while maintaining a proper seal with an interior wall 22 of the housing 2. For example, the ends 26 and 27 may be sealed by conventional cup seals utilizing a leak tight seal arrangement between the ends 26 and 27 and the housing 2. This component arrangement is relatively low cost, and few manufacturing problems are encountered with it, even when high valve production is maintained. The ends 26 and 27 each have a channel 40 extending axially inwardly of the body part 25. The channel 40 is positioned so that it is aligned with the connectors 10 and 11 for purposes later described in detail.

A pilot body 50 of a pilot assembly 90 is mounted to the housing 2 by a conventional bracket 51. In the embodiment illustrated, the bracket 51 is integrally formed with the bracket 16, although the brackets may be constructed separately, if desired. The pilot body 50 has a first end 52 and a second end 53. An axial opening 54 extends between the ends 52 and 53. The end 53 is closed by a suitable seal 55, which is attached to the pilot body 50 by any convenient method. Again, welding or brazing works well. A solenoid assembly, portions of which are not shown for drawing simplicity, also is mounted to the housing 2 along the end 52 thereof. The solenoid assembly includes a tube 32 having a plunger 17 movably mounted in it. The tube 32 has a closed first end and a flared second end attached to the end 52 of the pilot body 50 by any convenient method. The closed end of the tube 32 has a plug 19 inserted in it, which is held positionally by a crimp 20 in the tube 32. It is conventional to place a spring 18 between the plug 19 and the plunger 17 so that the spring 18 exerts a force on the plunger 17 in some predetermined direction. The electrical portion of the solenoid assembly structure is conventional and, as indicated above, is not shown for drawing simplicity. The plunger 17, in the embodiment illustrated, has an end 41 carried in the tube 32. The end 41 has a channel formed in it, which receives the spring 18 in a conventional manner. An end 42 of the plunger 17 extends within the opening 54. An end 42 has a reduced diameter portion 43 generally having an I-shape in cross section. A base 60 of the I defines a support 44 while a web 61 of the I defines a connection portion 45.

Figure 5:
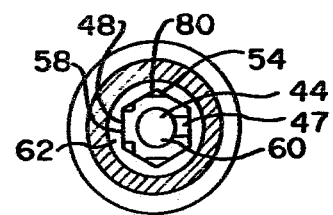
FIG. 5 is a sectional view taken along the line 5—5 of FIG. 4.

A pilot slide 46 is mounted to the plunger 17 along the connection portion 45. Pilot slide 46 has a slot 47 formed in it, best seen in FIG. 5. The slot 47 is sized to receive the web 61 so that the web 61 may be inserted into the slot 47. When so placed, the pilot slide rests on the support 44 and is contained by the I-shape cross section of the portion 43. Additionally, the pilot slide 46 has a shape acceptable to the cross section of the opening 54. In the embodiment illustrated, at least a small diameter part 80 of the opening 54 is hexagonal in cross section, and the slide 46 has a design silhouette compatible with that cross section. The slide 46 encircles the web 61 except along the slot 47. The slide 46 rides within the axial opening 54 of the pilot body 50 in a loose fit. This is an important feature of our invention, in that alignment between the plunger 17 and pilot body 50, and consequently between the plunger and pilot slide is not critical, the slide being adopted to overcome high tolerance misalignment in those parts without malfunction. A surface 48 of the pilot slide 46 is flat fitting with a side wall 58 defining the small diameter part 80 of opening 54 in the pilot body 50. That is to say, the hexagonal shape of the side wall 58 has a surface 62 which coincides with the surface 48 of the pilot slide 46. Surface 48 also has a pilot channel 49 formed in it, the purpose of which is described in greater detail hereinafter.

Figure 2:
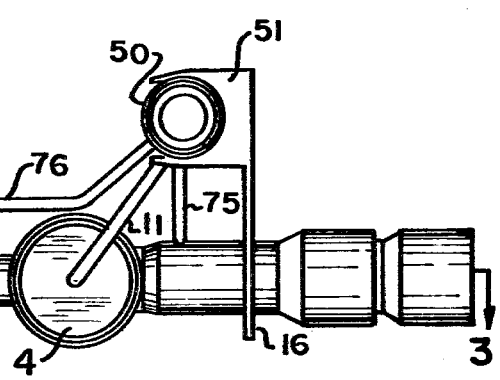
FIG. 2 is a view in end elevation of the valve shown in FIG. 1.

The pilot body 50 has a radial opening 70 formed in it, communicating with the axial opening 54, the opening 70 being positioned near the end 53 of the body 50. A series of radial openings 71, 72 and 73 also extend through the body 50, communicating with the opening 54 along the small diameter part 80 thereof. As previously indicated, the connector 10 extends between the end 3 of the valve and the opening 73. The connector 11 extends between the end 4 of the valve and the opening 71. A connector 75 extends between the opening 72 and the outlet 13, that interconnection being best observed in FIG. 2. Finally, a connector 76 extends between the inlet 12 and the opening 70.

Figure 4:
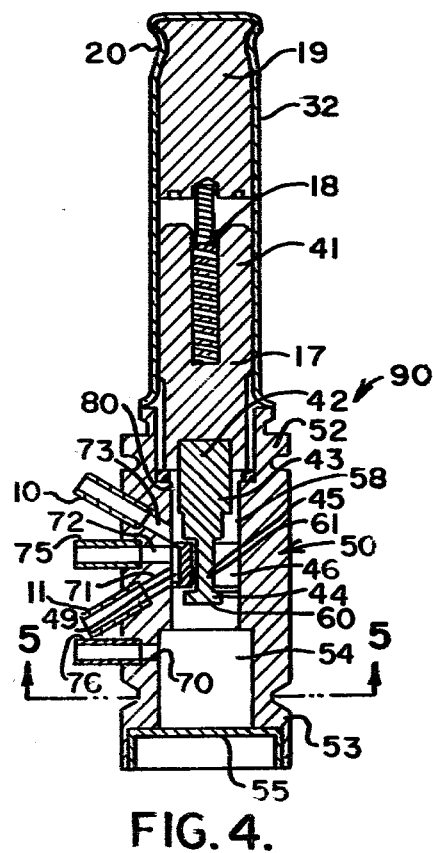
FIG. 4 is a sectional view, partly broken away, taken along the line 4—4 of FIG. 1.

The channel 49 in the pilot slide 46 is sized so that it may connect one of the openings 73 and 71 with the opening 72. When the pilot slide 46 is in its extreme downward position, as shown in FIG. 4, the opening 71 is connected to the opening 72 along the slot 49 so that the chamber 39 is connected to the outlet low pressure side of the valve through the connector 11. The high pressure from the inlet 12 is applied to the chamber 38 along the connector 76, opening 70, opening 54 and opening 73 in the pilot body 50. As indicated, this high pressure, in fact, is utilized to hold surface 48 of the pilot slide 46 against the surface 62 of the opening 54.

When the plunger 17 is pulled upwardly, upwardly being referenced to FIG. 4, as by activation of the solenoid, not shown, the pilot slide 46 is pulled upwardly with the plunger, so that the opening 73 is connected to the opening 72, by the channel 49, while the opening 71 is permitted to communicate with the high pressure from the opening 70. High pressure then enters the connector 11 to the chamber 39 side of the valve while the chamber 38 simultaneously is connected to a source of low pressure so that the main valve 24 moves to the position opposite from that shown in FIG. 3. The channel 40 in the ends 26 and 27 of the main valve member 24 ensures that the high pressure fluid, when applied, can commence valve member 24 movement.

As will be appreciated by those skilled in the art, the valve 1 may be connected in a refrigeration system, for example, having a condenser-evaporator, and an evaporator-condenser, with the usual interconnections therebetween. When such a combination is provided for reverse cycle or heat pump operation, the condenser alternates as an evaporator and the evaporator alternates as a condenser. In the heat pump or reverse cycle refrigeration applications, the high pressure inlet pipe 12 is connected to the outlet side of a suitable compressor, not shown, so that it will provide a source of high pressure refrigerant. The outlet pipe 13 is connected back to the compressor. The working line 14 is connected to one condenser-evaporator and the working line 15 is connected to the other condenser-evaporator. In the position shown in FIG. 3, high pressure from the inlet 12 is admitted along the hollow 30 and proceeds to the working line 14 along a space 56. The working line 15 is connected to the outlet 13 along the pocket 31. When the main valve is moved upwardly by the pilot actuation, the inlet 12 is connected to the working line 15 through another one of the spaces 56 and the working line 14 is connected to the outlet 13 along the pocket 31. The main slide 24 is positioned either upwardly or downwardly by the action of the pilot assembly 90. As indicated, it is important that the surface 48 be flat fitting with the surface 62 of the opening 54, as the high pressure from the opening 70 is utilized to seat the pilot slide in the operation thereof.

Numerous variations, within the scope of the appended claims, will be apparent to those skilled in the art in light of the foregoing description and accompanying drawings. Thus, the design silhouette of the valve 1 may vary. In like manner, the design of the main slide valve 24 may be changed. While particular shapes, sizes and materials are described in conjunction with the embodiment illustrated in the drawings, one or more of these features may be altered in other embodiments, if desired. Since the pilot assembly 90 employs a solenoid and pilot body which operate independently the operation of the solenoid is essentially independent of the travel of the valve slide 24, and the assembly 90 may be utilized in conjunction with a variety of other main valve embodiments. These variations are merely illustrative.

Having thus described the invention, what is claimed and desired to be secured by Letters Patent is:

1. A four way valve assembly, comprising:
    a valve housing having a cavity in it, said housing having an inlet, an outlet and a pair of working lines connected to it and communicating with said cavity;
    a main valve member movably mounted in said cavity and adapted to connect the outlet and inlet of said valve selectively to said working lines, said valve member having ends which cooperate with said housing to define a pair of opposed chambers in said housing;
    a pilot body mounted to said valve housing, said pilot body having an axial opening in it, and at least four radial openings extending through it, said radial openings communicating with said axial opening;
    a plurality of fluid connectors connected between the radial openings in said pilot body and said valve housing, one of said connectors extending between said inlet and one radial opening, a second of said connectors extending between said outlet and the second of said radial openings, the third and fourth of said connectors extending between respective ones of said opposed chambers in said housing and said third and fourth openings; and
    a solenoid actuated mechanism mounted to a first end of said pilot body, said solenoid actuated mechanism including a plunger movably mounted in said body, and a pilot slide mounted to said plunger and movable therewith, said pilot slide having a cavity formed in it for interconnecting one of said third and said fourth connectors with said inlet and said outlet connectors to operatively connect opposed ones of said chambers with high pressure fluid, said plunger having a slot formed in it, said slot being sized to receive a portion of said plunger in a loose fit, said high pressure fluid maintaining said pilot slide in a selected position with respect to said connectors and properly positioned with respect to said plunger.

2. The four way valve of claim 1 wherein said pilot body includes a portion having a hexagonal shape, said pilot slide having a surface which mates with a surface of said hexagonal shape, said radial openings communicating with said axial opening of said pilot body along said hexagonal surface.

3. The valve of claim 2 wherein said pilot slide is annular in plan.

4. The valve of claim 3 wherein said plunger includes a portion having an I-shape in cross section, said slot adapted to receive a web of said I to mount said pilot slide to said actuator.

5. The valve of claim 4 wherein said main valve member has an axially extending channel formed in the opposed ends thereof.

6. The valve of claim 5 wherein the opposed ends of said main valve member have cup seals attached to them.

7. The valve of claim 6 wherein said main slide member has a body part, said body part having a hollow formed on one side of it, and a pocket formed on a diametrically opposite side of it.

8. A valve assembly, comprising:
    a valve housing having a cavity in it, said housing having an inlet, an outlet and a pair of working lines connected to it and communicating with said cavity;
    a main valve member movably mounted in said cavity and adapted to connect the outlet and the inlet of said valve selectively to said working lines, said valve member having ends which cooperate with said housing to define a pair of opposed chambers in said housing;

a pilot body mounted to said valve housing, said pilot body having an axial opening in it, and at least four radial openings extending through it and communicating with said axial opening;

a plurality of pilot connectors connected between the pilot body openings and said valve housing, one of said connectors extending between said inlet and one of said radial openings, a second one of of said connectors extending between said outlet and another of said radial openings, the third and fourth of said connectors extending between respective ones of said opposed chambers in said housing and the third and fourth of said radial openings; and a solenoid actuated mechanism mounted to a first end of said pilot body, said solenoid actuated mechanism including a plunger movably mounted with respect to the body, and a pilot slide intermounted on said plunger to permit at least relative radial movement between said slide and said plunger to compensate for part assembly tolerances in the manufacture of said valve, pressure from said inlet connector positioning the pilot slide radially against said pilot body in a preselected position of said pilot slide.

9. The valve assembly of claim 8 wherein said pilot slide has a slot formed in it, said plunger including a portion having an I-shape in cross section, said slot adapted to receive a web of said I to mount said pilot slide to said actuator.

10. The valve assembly of claim 9 wherein movement of said slide simultaneously connects the respective ones of said opposed chambers in said housing to one of a high pressure source and a low pressure source to afford more positive shifting of said main valve member.

* * * * *